United States Patent Office 3,501,042
Patented Mar. 17, 1970

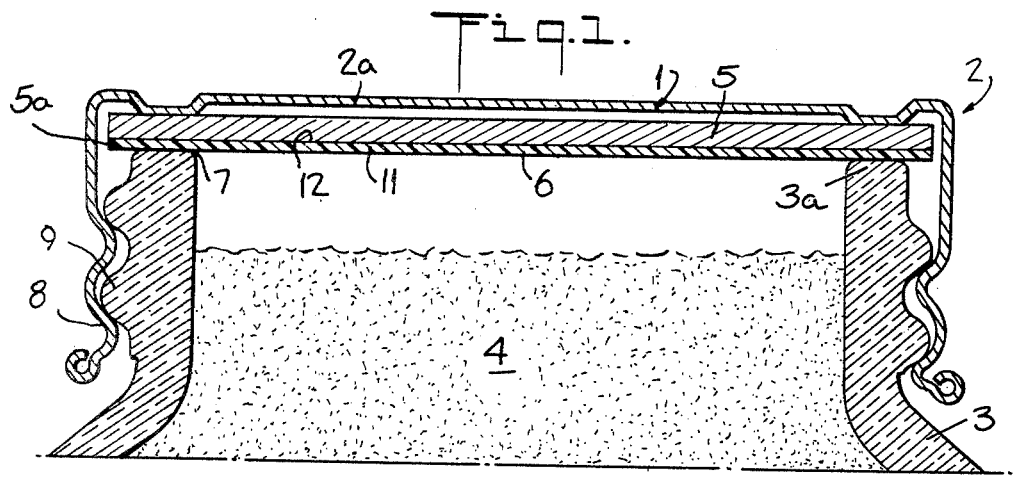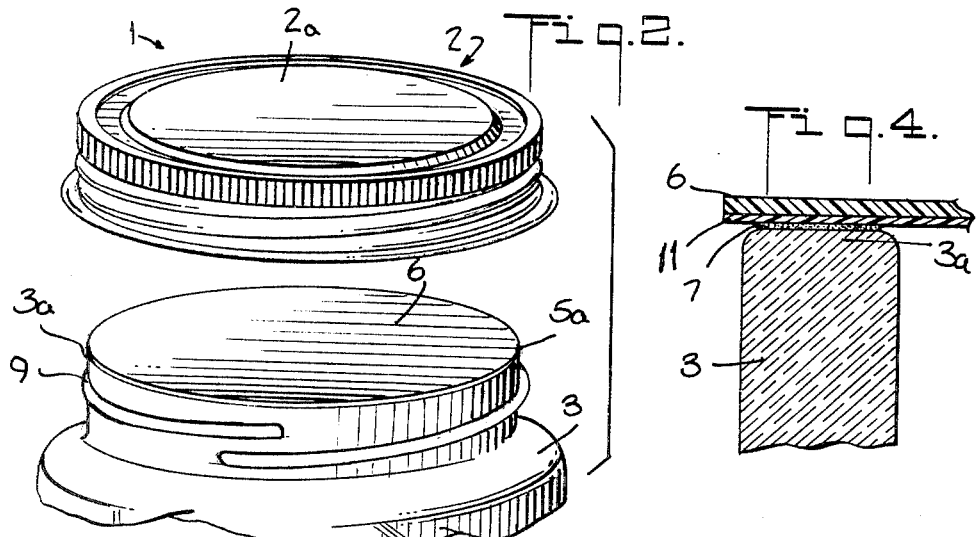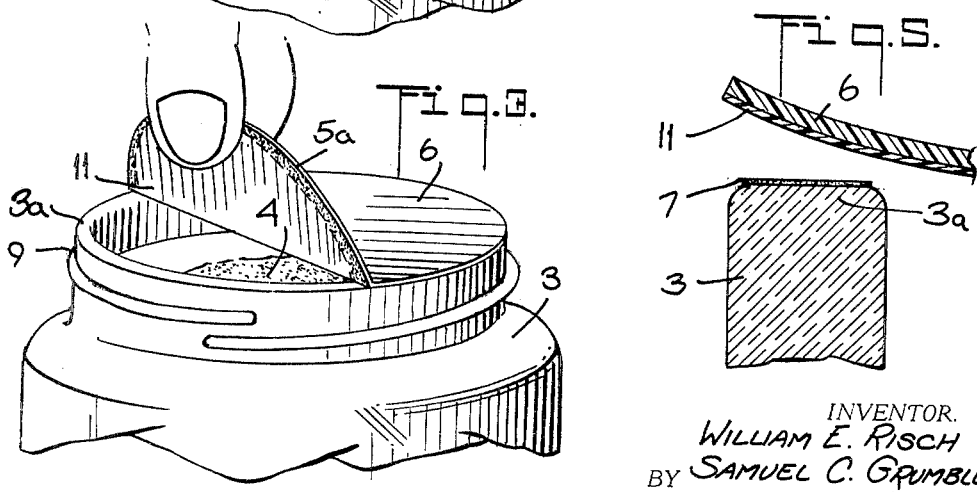

3,501,042
CLEAN RELEASE INNERSEAL
William E. Risch and Samuel C. Grumbles, Lancaster, Ohio, assignors to Anchor Hocking Glass Corporation, Lancaster, Ohio, a corporation of Delaware
Filed June 5, 1968, Ser. No. 734,700
Int. Cl. B65d 23/00
U.S. Cl. 215—40           7 Claims

ABSTRACT OF THE DISCLOSURE

A method and means for providing a clean release safety innerseal for products packaged in open mouthed containers comprising the provision of a polymer coating on the underside of the innerseal material, which coating is bonded by a selected adhesive to the rim of the container while preventing the adhesive from penetrating into the innerseal material. The bond between the adhesive and the coating while hermetically sealing the container is substantially weaker than the bond between the coating and the innerseal material so that no innerseal material clings to the rim of the container upon the breaking of the adhesive bond permitting an easy clean release of the seal when the material in the container is to be used.

BACKGROUND OF THE INVENTION

The present invention involves an improved method and means for sealing packaged products and, more particularly, provides a thin innerseal which hermetically seals packaged products in glass containers and which permits clean release of the innerseal when the product is to be used, leaving no particles of the innerseal material on the container rim and requiring no special tools.

For many years the packaging industry has employed a thin innerseal over the mouths of containers in the packaging of dry products such as soluble coffee, instant tea, powdered milk, pharmaceuticals and the like. These innerseals function as tamperproof, devices, oxygen and moisture barriers and as a carrier for advertising and merchandising messages.

The innerseal is generally applied to a container by first being inserted into the metal or plastic closure cap during the manufacture of the caps and is supported in the closure by weakly bonding it to the cap liner material which is generally composed of waxed pulpboard, waxed vinyl coated paper or the like. In essentially all applications, the innerseal is adhered to the container sealing surface by a liquid adhesive which is applied to the container rim just previous to capping. The closure cap is then placed on the container pressing the seal against the rim. The liquid adhesive when dry or partially dry acts to adhere the innerseal to the container sealing surface or rim so that it remains thereon when the closure and liner are removed.

The removal of the innerseal from the container has frequently posed a problem for the consumer, as it can be a difficult and untidy process. Many users simply punch a hole through the innerseal and remove the inner portion from the container opening by tearing. This leaves ragged pieces of the seal material adhered to the lip of the container to catch particles of the product when it is dispensed. As a result some of the product may collect on the jagged pieces rendering the container opening unsightly. To avoid this some consumers have neatly cut the center portion of the innerseal from the jar but this process involves the inconvenience of using a suitable tool to make the incision in the innerseal.

It is therefore desirable in the packaging art to provide an innerseal which will provide adequate barrier properties while acting as a base for printing merchandising messages, and which will release cleanly from the container sealing surface without leaving untidy fibers adhered thereto and without requiring the use of particular tools. Prior known attempts to solve this clean release innerseal problem have proven to be functionally or economically unsuccessful.

SUMMARY OF INVENTION

The present invention solves this packaging problem by providing a method and means for constructing a reliable and inexpensive innerseal for dry packaged products which also may be cleanly removed from the container rim by merely gripping and finger stripping the innerseal material therefrom. This desirable result is accomplished by coating the innerseal material on its underside with a thin polymer layer which is adhered to the container rim by a selected adhesive and which prevents the adhesive from penetrating into the innerseal material. The polymer coating forms a bond with the adhesive that is weaker than the bond formed with the innerseal material so that no innerseal material will cling to the rim of the container when the innerseal is removed to gain access to the packaged product.

It is therefore an object of the present invention to provide an improved method and means for sealing packaged products.

It is another object of the present invention to provide an improved innerseal for dry packaged products.

It is another object of the present invention to provide an improved innerseal having a coating thereon which permits clean release of the innerseal material from the container rim.

A further object of the present invention is to provide an improved method for producing a clean release innerseal.

Another object of the present invention is to provide an improved innerseal for hermetically sealing dry packaged products while permitting clean release from the rim of the container to avoid an untidy condition or contamination of the product by the innerseal.

Other and further objects of the invention will be obvious upon an understanding of the illustrative embodiment about to be described, or will be indicated in the appended claims, and various advantages not referred to herein will occur to one skilled in the art upon employment of the invention in practice.

DETAILED DESCRIPTION OF THE DRAWINGS

A preferred embodiment of the invention has been chosen for purposes of illustration and description and is shown in the accompanying drawings, forming a part of the specification wherein:

FIG. 1 is a sectional view of the upper portion of a sealed package containing a powdered product and showing a closure cap containing a liner and the improved innerseal of the present invention in the normally sealed condition;

FIG. 2 is a perspective view of the upper portion of the package shown in FIG. 1 with the cap and liner removed and showing the improved innerseal in sealing relationship on the container;

FIG. 3 is a perspective view, as in FIG. 2, showing the improved innerseal being cleanly stripped from the rim of the container to permit access to the product contained therein;

FIG. 4 is an enlarged sectional view in detail of the improved innerseal adhered to the rim of the container; and FIG. 5 is a view as in FIG. 4, showing the improved innerseal being removed cleanly from the rim of the container.

DETAILED DESCRIPTION OF THE PREFERRED EMBODIMENT

FIG. 1 shows a sealed package 1 comprising a metal closure cap 2 on a glass container 3 filled with a dry powdered product 4 such as instant coffee or tea or the like. A cap liner 5 an an innerseal 6 are interposed between the cap cover 2a and the container rim 3a. The preferred embodiment of the present invention will be described in connection with a locking lug type cap and a glass container as shown, but it will be understood that the present invention may be used with caps, containers and products of various types and materials.

In constructing this sealed package the usual procedure is to weakly bond the innerseal 6 to the liner material 5, which may be of waxed pulpboard, waxed vinyl coated paper or the like, and to insert this composite into the metal or plastic cap during its manufacture. Just prior to the placing of the cap 2 on the product-filled container 3 a liquid adhesive 7 is applied to the rim of the container. The cap is then placed and rotated onto the neck of the container with the lugs 8 camming down and locking on the glass threads 9 and causing the cover portion 2a of the cap to press the liner 5 tightly against the rim 3a. The dry or partially dried adhesive 7 then adheres the innerseal 6 to the container sealing surface 3a, forming a tamperproof and oxygen and moisture barrier for the contents 4 of the container. This sealed package 1 may then be handled and shipped for sale to the consumer without danger of contamination or undetected tampering with the product contained therein.

The closure cap 2 may be constructed with an inturned portion just below the cover 2a which forms an internal ledge (not shown) and the pulpboard liner 5 is of such a diameter that its outer edge 5a extends beyond the rim 3a of the container 3 and above either the closure ledge portion or the lugs 8. Thus, when the consumer removes the closure 2 from the container 3 to gain access to the product 4 the closure ledge or the lugs 8 will lift the liner 5 away from the rim 3a breaking the weak bond between it and the innerseal 6 and leaving the innerseal 6 adhered to the container rim 3a in sealing relationship, as shown in FIG. 2.

The sealed surface between the innerseal material and the container rim formed by the present invention is shown in detail in FIG. 4. The improved innerseal 6 may be of any of a number of different materials used for this purpose but is preferably of glassine which is the most commonly used material. The glassine 6 is provided with a thin undercoating 11 of a polymer material, such as polyvinylidene or polyvinyl chloride. This coating 11 is suitably inert so that it will not contaminate or react with the contents 4 of the containers 3 and will also be impervious to and insoluble in the liquid adhesive 7 which is used to adhere it to the glass container rim 3a.

In the process of manufacturing this coated innerseal 6 and bonding it to the closure liner 5 a somewhat different method is used from that of the prior art.

In the preferred method of the present invention the innerseal material 6 is first coated with the vinyl layer 11. Thereafter the innerseal 6 is lightly bonded to the liner 5 by a bonding platen or otherwise using a weak-bonding adhesive 12. The weak-bonding adhesive 12 may be wax base type in which case the bonding platen is heated.

The selected adhesive 7 for application to the container rim 3a is a polyvinyl acetate emulsion which will form a sufficient bond between the vinyl coating 11 and the glass rim 3a to act as an oxygen and moisture barrier for the interior of the container 3 but which bond is sufficiently weak to permit ready release of the vinyl coating 11 from the rim 3a when the innerseal 6 is finger stripped from the container. This bond will also be strong enough to maintain the seal 6 on the rim 3a when the liner 5 is removed therefrom. A particular polyvinyl acetate adhesive which has been found suitable in this application is produced by the Arabol Division of the Borden Company and is identified as GRC-8.

The clean release feature of the present invention is obtained by virtue of the vinyl coating 11 on the glassine innerseal material 6 prohibiting the penetration of the adhesive 7 into the innerseal material 6 and therefore the adhesive 7 does not directly adhere particles of the innerseal 6 to the container sealing surface 3a as may be seen in FIG. 4. The adhesive coating bond is significantly weaker than the bond between the coating 11 and the innerseal 6. Thus, when the innerseal 6 is lifted from the rim in the stripping operation (as shown in FIG. 3) the innerseal material 6 with its undercoating 11 will be released from the container rim 3a breaking the adhesive bond between the coating and the rim without leaving any particles of the innerseal material 6 adhered thereto. This latter operation is shown in detail in FIG. 5.

It is thus seen that an improved clean release innerseal is provided which is functionally superior and less expensive to produce than other seals which have been attempted in solving the clean release problem and which may be incorporated in presently existing innerseals without the need for special modification of the packages on which they are to be used.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a package comprising a container and a closure cap with a liner and an innerseal the improvement which comprises a coating on the innerseal, an adhesive adhering said innerseal coating to the rim of the container, the coating to innerseal bond being stronger than the coating to adhesive bond such that the innerseal may be cleanly removed from the container rim.

2. A package as claimed in claim 1 wherein the coating comprises polyvinyl chloride.

3. A package as claimed in claim 1 wherein the adhesive comprises a polyvinyl acetate emulsion.

4. A package as claimed in claim 1 wherein the innerseal material comprises glassine.

5. A package as claimed in claim 1 wherein the coating comprises polyvinyl chloride and the adhesive comprises a polyvinyl acetate emulsion.

6. A sealing means for containers having a removable closure comprising a layer of sealing material, a coating on said material, an adhesive adapted for adhering said coating to the rim of the container, said coating being impervious to said adhesive, and the coating bond to the sealing material being stronger than the adhesive bond to the sealing material whereby the sealing material may be cleanly removed from the container.

7. A sealing means for containers having a removable closure comprising a layer of glassine material, a polymer coating on the glassine, an adhesive for adhering said coating to the rim of the container, said coating being impervious to said adhesive for preventing the adhesive from penetrating to the glassine material, and the adhesive bond between the coating and the rim being weaker than the bond between the coating and the glassine material permitting clean removal of glassine material from the containers.

References Cited

UNITED STATES PATENTS

| | | | |
|---|---|---|---|
| 2,925,188 | 2/1960 | Grumbles | 215—40 XR |
| 2,946,471 | 7/1960 | Randlett | 215—40 XR |
| 3,061,130 | 10/1962 | Husom | 215—40 |

GEORGE T. HALL, Primary Examiner

U.S. Cl. X.R.

215—43